United States Patent
Toukou

(10) Patent No.: US 6,256,567 B1
(45) Date of Patent: Jul. 3, 2001

(54) SPEED-CHANGE PATTERN SWITCHING CONTROL SYSTEM FOR AUTOMATIC TRANSMISSION OF MOTOR VEHICLE

(75) Inventor: Masakazu Toukou, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/369,854

(22) Filed: Aug. 9, 1999

(30) Foreign Application Priority Data

Feb. 22, 1999 (JP) .................................................. 11-043126

(51) Int. Cl.$^7$ ............................. G06F 17/00; G06F 19/00; G06F 7/00
(52) U.S. Cl. ............................. 701/51; 701/52; 701/121; 477/80; 477/91; 477/101
(58) Field of Search .................................. 701/51, 52, 61, 701/79, 121; 477/120, 138, 904, 80, 91, 101

(56) References Cited

U.S. PATENT DOCUMENTS

| | | | |
|---|---|---|---|
| 5,655,995 | * | 8/1997 | Kondo et al. ........................ 477/155 |
| 5,752,210 | * | 5/1998 | Kato et al. .............................. 701/51 |

FOREIGN PATENT DOCUMENTS 7-167274   7/1995   (JP) .

* cited by examiner

Primary Examiner—William A. Cuchlinski, Jr.
Assistant Examiner—Gertrude Arthur
(74) Attorney, Agent, or Firm—Sughrue, Mion, Zinn, Macpeak & Seas, PLLC

(57) ABSTRACT

A speed-change pattern switching control system for an automatic transmission of a motor vehicle which can ensure enhanced comfort when driving the motor vehicle. The system decides the running state of the motor vehicle on the basis of driving/operation information (Te, Tm, Tα, αf, αs), performs a first filter processing on the running state information and the driving/operation information (Vs, θ, αf, Ws, Ps), stores the manipulated information (Jm) for the motor vehicle in the manual speed change mode, performs a second filter processing on the manipulation information (Jm) in the manual speed change mode, outputs of the running state and the driving/operation information, and corrects speed-change patterns for the automatic transmission on the basis of output signals of the first and second filter processing. The correction is designed to correct the speed-change pattern for the automatic transmission so that the output of the second filter processing can be reflected in the correction of the speed-change pattern upon changeover to the automatic speed change mode from the manual speed change mode.

6 Claims, 6 Drawing Sheets

SPEED-CHANGE PATTERN SWITCHING CONTROL SYSTEM FOR AUTOMATIC TRANSMISSION OF MOTOR VEHICLE

BACKGROUND OF THE INVENTION

1. Field of the Invention

The present invention relates to a control system for controlling changeover or switching of speed-change patterns for an automatic transmission mounted on a motor vehicle in dependence on driving/operation information such as information of driving or running state of the motor vehicle and information of operation states of an internal combustion engine mounted on the motor vehicle as well as that of the transmission. More specifically, the present invention is concerned with a speed-change pattern switching control system for the automatic transmission of the motor vehicle which system can ensure comfortableness of driving the motor vehicle in an automatic speed change mode (or automatic transmission shift mode) validated after resetting of a manual speed change mode (or manual transmission shift mode) by storing proper reference data acquired on the basis of the driving/operation information during a period in which the motor vehicle is driven in the manual speed change mode with the transmission (also known as the speed change gear) being manipulated or shifted manually by the driver.

2. Description of Related Art

Heretofore, the automatic transmission for the motor vehicles which is automatically shifted in accordance with speed-change patterns set previously in conformance with the driving/operation information is well known in the art. At this juncture, it is also noted that many of the automatic transmissions of this type are so designed that a manual speed change mode can be selectively effectuated or validated with a view to making it possible to change the speed of the motor vehicle manually by the driver so as to reflect his or her will or preference in the running behavior of the motor vehicle or to manipulate the motor vehicle at liberty of the driver, to say in another way.

Furthermore, in order to ensure comfortableness of individual drivers in driving the motor vehicle which may differ from one to another driver, there have been proposed and developed various systems for controlling the changeover or switching of the speed-change patterns themselves in dependence on the driving/operation information mentioned previously.

For having better understanding of the invention, a background technique thereof will be described in some detail. FIG. 5 is a flow chart for illustrating operations of a hitherto known or conventional speed-change pattern switching control system for an automatic transmission of a motor vehicle described, for example, in Japanese Unexamined Patent Application Publication No. 167272/1995(JP-A-7-167272) or No. 167274/1995(JP-A-7-167274). The processing procedure illustrated in FIG. 5 is executed by a processor incorporated in an electronic control unit (hereinafter also referred to as the ECU for short) mounted on a motor vehicle. Further, FIG. 6 is a view for graphically illustrating exemplary speed-change patterns in a conventional automatic transmission.

Now, referring to FIGS. 5 and 6, description will be made of operations of the conventional speed-change pattern switching control system for the automatic transmission of the motor vehicle.

Referring to FIG. 5, the ECU fetches driving/operation information detected by various sensors mounted in association with the internal combustion engine of the motor vehicle such as engine torque Te, vehicle speed Vs, throttle opening degree $\theta$, etc.) in a step S1, to thereby decide the running or driving state of the motor vehicle on the basis of the operation state or performance of the engine mounted on the motor vehicle in a step S2. Further, the ECU decides the running or driving state of the motor vehicle on the basis of tire performance (step S3).

Subsequently, the ECU makes decision as to whether the current driving/operation information indicates the manual speed change mode or the automatic speed change mode in a step S4. When the driving/operation information indicates the automatic speed change mode (i.e., when the decision step S5 results in negation "NO"), information concerning the driving/operation state of the motor vehicle is acquired in a step S5, whereon changeover or switching of the speed-change patterns for the automatic transmission mode (automatic speed change mode) is carried out on the basis of speed-change pattern decision reference data derived from the acquired information in a step S6.

On the other hand, when it is decided in the step S4 that the current driving/operation information indicates the manual speed change mode (i.e., when the decision step S4 results in affirmation "YES"), the speed-change pattern decision reference data used in the automatic speed change mode is erased to thereby initialize the speed-change pattern switching information (step S7).

Through the processing procedure described above, the speed-change pattern can be switched on the basis of the speed-change pattern decision reference data derived from the information of the driving/operation state of the motor vehicle in the automatic speed change mode. By way of example, referring to FIG. 6, the speed-change pattern set initially (indicated by a solid line curve) can be shifted to a mild pattern or sporty pattern indicated by broken line curves, respectively, in conformance with the driving/operation state of the motor vehicle in the automatic speed change mode.

More specifically, when the operator or driver desires to enjoy a sporty drive, so to speak, the speed-change pattern is shifted to the sporty pattern such as illustrated in FIG. 6. In that case, the vehicle speed changes from a value Vsu to a value Vss for a same throttle opening degree $\theta$°.

By contrast, when the operator or driver desires to enjoy a so-called mild drive, the speed-change pattern is shifted to a mild pattern illustrated in FIG. 6. In that case, the vehicle speed changes from the value Vsu to a value Vsm for a same throttle opening degree $\theta$°.

In this manner, in the automatic speed change mode, the speed-change pattern is changed over on the basis of the speed-change pattern decision reference data set previously in dependence on the road condition and the running state of the motor vehicle. More specifically, through the speed-change pattern switching control described above, the speed-change pattern can be changed finely in dependence on the speed-change pattern decision reference data derived from the driving/operation information.

On the other hand, when the manual speed change mode is selected or validated, the speed-change pattern decision reference data to be referenced in switching or shifting the speed-change pattern is reset for the reason that in the manual speed change mode, the speed change is not carried out in accordance with the speed-change pattern.

It is further noted that even when the speed-change pattern decision reference data is held or stored intactly in the manual speed change mode, the speed-change pattern decision reference data as held cannot always match with the running state of the motor vehicle prevailing when the automatic speed change mode is restored from the manual speed change mode. Besides, it should also be mentioned that the information which is not required for the system control in general should desirably be reset positively to the initial state.

For the reasons mentioned above, when the driver selects the manual speed change mode, the speed-change pattern decision reference data employed in the automatic speed change mode is erased or reset with the speed-change pattern being set back to the initially set pattern.

Such being the circumstances, when the automatic speed change mode is restored with the manual speed change mode being reset, there arises necessity of determining the speed-change pattern decision reference data on the basis of the driving/operation information by executing the information processing procedure described previously from the beginning thereof. In that case, unnecessary speed change operation will have to be performed repetitively over an extended time period which is required for the speed-change pattern decision reference data to converge to the pertinent value.

As will now be appreciated from the foregoing, in the case of the conventional speed-change pattern switching control system for the automatic transmission of the motor vehicle, the speed-change pattern decision reference data for the speed pattern changeover or switching is erased when the manual speed change mode is selected by the driver, which necessitates acquisition of the driving/operation information newly for determining the speed-change pattern decision reference data upon restoration of the automatic speed change mode from the manual speed change mode, presenting thus a problem that a lot of time is taken for determining the pertinent speed-change pattern decision reference data by repeating unnecessary speed changing manipulation.

SUMMARY OF THE INVENTION

In the light of the state of the art described above, it is an object of the present invention to provide a speed-change pattern switching control system for an automatic transmission of a motor vehicle which can avoid the problem mentioned above.

Another object of the present invention is to provide a speed-change pattern switching control system for an automatic transmission of a motor vehicle which is imparted with a learning function for learning manipulation behavior of a driver in manipulating a transmission gear in a manual speed change mode for thereby reflecting the driver's manipulation behavior in the speed change pattern selected in the automatic speed change mode.

In view of the above and other objects which will become apparent as the description proceeds, the present invention teaches that a decision processing which is validated when the driver selects or resets the manual speed change mode is provided in order to make available pertinent speed-change pattern decision reference data instantaneously without any appreciable delay upon restoration of the automatic speed change mode from the manual speed change mode for thereby ensuring comfortable driving or running performance after the resetting of the manual speed change mode.

Thus, there is provided according to a general aspect of the present invention a control system for controlling switching of speed-change patterns for an automatic transmission of a motor vehicle, which system includes various types of sensors for detecting driving states of the motor vehicle on which an automatic transmission is installed and operation states of the automatic transmission as driving/operation information, running state decision means for deciding the running state of the motor vehicle on the basis of the driving/operation information, a first filter means for performing a filter processing on the running state information and the driving/operation information, a manipulation information storage means for storing manipulation information concerning manipulation performed on the motor vehicle in the manual speed change mode, a second filter means for performing a filter processing on the manipulation information in the manual speed change mode, outputs of the running state decision means and the driving/operation information, and a correcting means for correcting speed-change patterns for the automatic transmission on the basis of output signals of the first and second filter means. The correcting means mentioned above is so designed as to correct the speed-change pattern for the automatic transmission on the basis of the output signal of the first filter means in the automatic speed change mode of the motor vehicle, while updating the output signal of the second filter means in the manual speed change mode. Upon changeover from the manual speed change mode to the automatic speed change mode of the motor vehicle, the speed-change pattern is corrected such that the output signal of the second filter means can be reflected in the speed-change pattern.

In a preferred mode for carrying out the invention, the filter constant of the second filter means may be set to a value differing from the filter constant of the first filter means.

More preferably, the filter constant of the second filter means should be set to a value greater than the filter constant of the first filter means.

In yet another preferred mode for carrying out the invention, the second filter means may be so designed as to be capable of setting variably the filter constant on the basis of manipulation information acquired in the manual speed change mode.

In still another preferred mode for carrying out the invention, the second filter means may be so designed as to set the filter constant to a relatively large value for decreasing a degree of sportiness when the manipulation information in the manual speed change mode of the motor vehicle indicates a mild operation state, while when the manipulation information in the manual speed change mode of the motor vehicle indicates a sporty operation state, the filter constant of the second filter means is set to a relatively small value for increasing the degree of sportiness.

In a further preferred mode for carrying out the invention, the correcting means may be so designed as to update the output signal of the second filter means for storage thereof when the motor vehicle is being driven in the manual speed change mode.

With the arrangements of the speed-change pattern switching control system for the automatic transmission described above, pertinent speed-change pattern decision reference data can be acquired speedily upon restoration of the automatic speed change mode from the manual speed change mode, whereby smooth transition of the running behavior of the motor vehicle can be realized to ensure comfortableness in driving the motor vehicle as if no changeover of the speed change modes took place.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
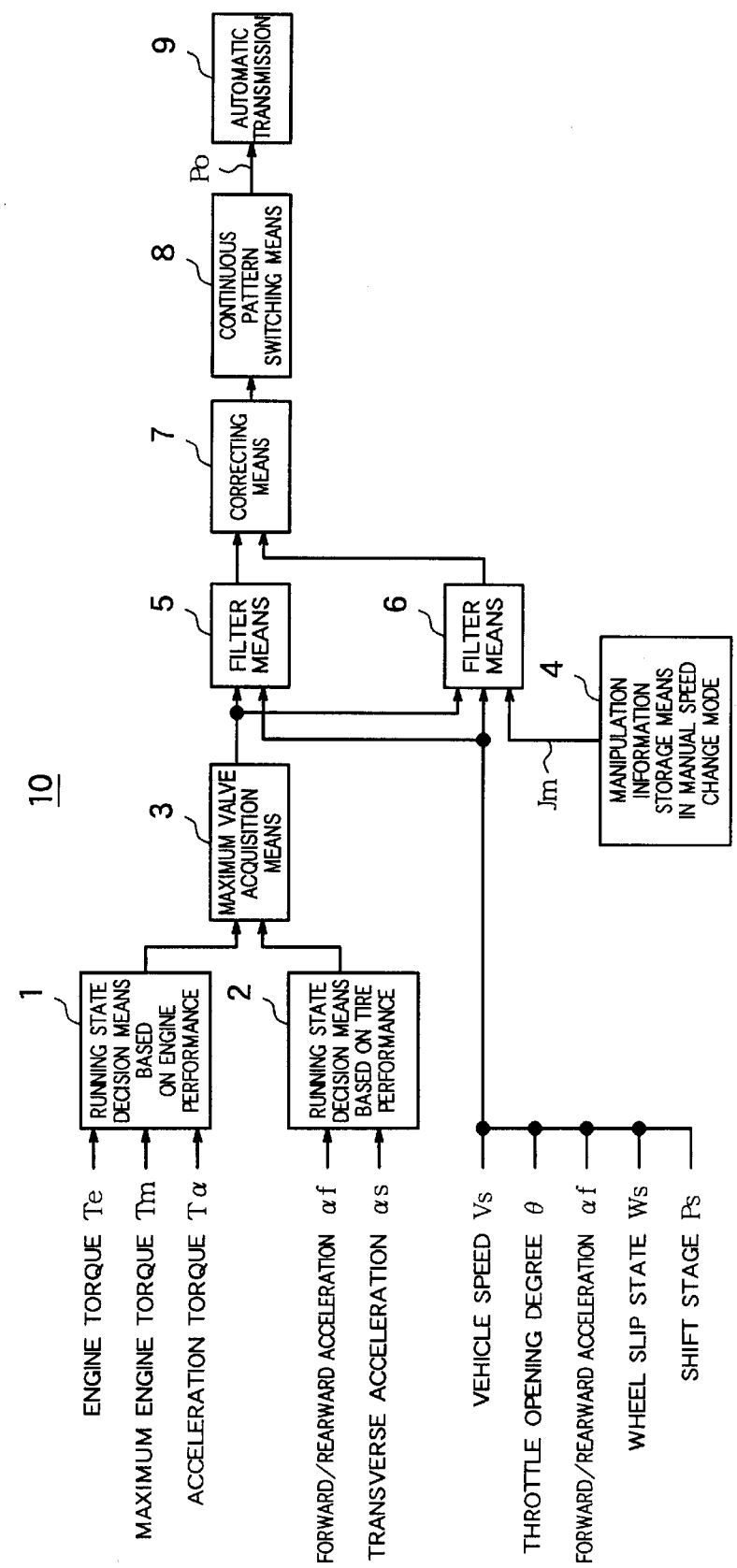
FIG. 1 is a functional block diagram showing functionally and generally an arrangement of a speed-change pattern switching control system for an automatic transmission according to an embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, description will be made of the speed-change pattern switching or changeover control system for an automatic transmission of a motor vehicle according to a first embodiment of the present invention. FIG. 1 is a functional block diagram showing functionally and generally a configuration of a speed-change pattern switching control system for an automatic transmission which is comprised of an ECU (Electronic Control Unit) 10 and mounted on a motor vehicle.

Referring to FIG. 1, the motor vehicle or automobile equipped with an automatic transmission is provided with various types of sensors (not shown) for detecting driving/operation states of the motor vehicle inclusive of the engine and manipulations of the automatic transmission. The information indicative of the driving/operation states mentioned above will hereinafter be referred to as the driving/operation information while the information indicative of manipulation of the transmission in the manual speed change mode will be referred to as the manipulation information.

As the driving/operation information detected by the various sensors, there can be mentioned the information represented by the signals indicative of an engine torque Te, a maximum engine torque Tm, an acceleration torque Tα, a forward/rearward acceleration αf, a transverse acceleration αs, a vehicle speed Vs, a throttle opening degree $\underline{\theta}$, a tire or wheel slip state Ws and a speed or shift stage (gear position) Ps of the transmission validated currently, respectively. These signals are inputted to the vehicle-onboard ECU 10.

The vehicle-onboard ECU 10 is comprised of a first running state decision means 1 for determining the running state of the motor vehicle on the basis of the engine performance information, a second running state decision means 2 for determining the running state of the motor vehicle on the basis of the tire or wheel performance information, a maximum value acquisition means 3, an manipulation information storage means 4 for storing information concerning manipulations performed by the driver in a manual speed change mode, filter means 5 and 6, a correcting means 7 and a continuous pattern switching means 8, and is so designed or programmed as to generate an output signal Po based on the finally selected speed-change pattern, which signal is then supplied to an automatic transmission 9 for the shift control thereof.

The first running state decision means 1 for determining the running state of the motor vehicle on the basis of the engine performance information is so designed as to determine or decide the engine-performance-based running state on the basis of the engine torque Te, the maximum engine torque Tm and the acceleration torque Tα.

On the other hand, the second running state decision means 2 for determining the running state of the motor vehicle on the basis of the tire or wheel performance information is so designed as to determine or decide the tire-performance-based running state of the motor vehicle on the basis of the forward/rearward acceleration αf and the transverse acceleration (or cross acceleration) αs.

The maximum value acquisition means 3 is so designed as to derive the maximum values from the running state decision values, respectively, which in turn are derived from the outputs of the first and second running state decision means 1 and 2, respectively. The manipulation information storage means 4 is designed for storing the manipulation information Jm concerning the operation or manipulation performed by the driver during the manual speed change mode.

The first filter means 5 is put into operation in the ordinary automatic speed change mode for performing filter processing on the maximum running state decision values outputted from the maximum value acquisition means 3 and the driving/operation information such as the vehicle speed Vs, the throttle opening degree $\underline{\theta}$, the forward/rearward acceleration αf, the wheel slip state Ws and the shift stage Ps of the transmission.

On the other hand, the second filter means 6 is put into operation upon restoration of the automatic speed change mode from the manual speed change mode for performing filter processing on the aforementioned manipulation information Jm obtained and stored in the manual speed change mode, the maximum running state decision values and the driving/operation information such as the vehicle speed Vs, the throttle opening degree $\underline{\theta}$, the forward/rearward acceleration αf, the wheel slip state Ws and the shift stage (gear position) Ps of the transmission.

To say in another way, the filter means 5 and 6 are so designed as to perform filter processings on the information indicative of greater ones of the output values of the running state decision means 1 and 2, respectively, in accordance with the manipulations performed by the driver.

In this conjunction, it should be noted that the filter constant KF2 of the filter means 6 provided for filtering the manipulation information Jm obtained and stored in the manual speed change mode differs from the filter constant KF1 of the filter means 5. The former is set at a greater value than the latter so that the manipulation information Jm in the manual speed change mode can be speedily reflected in the correction of the speed-change pattern.

Furthermore, the filter means 6 is so designed as to be capable of setting variably the filter constant KF2 for each of the individual manipulation information Jm in the manual speed change mode in dependence on the driving/ operation information such as the vehicle speed Vs, the throttle opening degree $\theta$ (inclusive of the throttle valve manipulating speed), the forward/rearward acceleration $\alpha f$, the shift stage Ps, etc. and the manipulation information Jm in the manual speed change mode.

Figure 6:
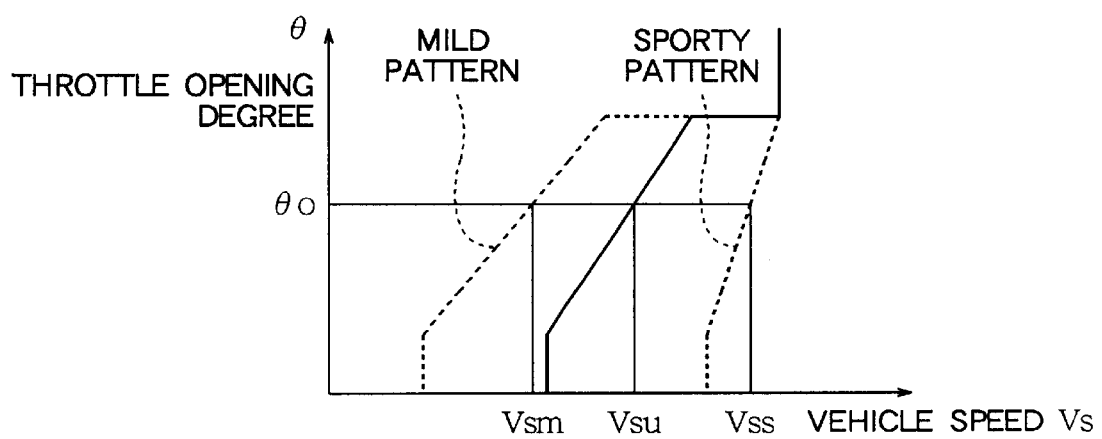
FIG. 6 is a view for graphically illustrating typical speed-change pattern switching operations carried out by a speed-change pattern changeover control system for an automatic transmission known heretofore.

More specifically, when the manipulation information Jm in the manual speed change mode indicates a mild driving state (see FIG. 6), the filter constant KF2 for decreasing the degree of the sportiness (hereinafter also referred to as the sportiness degree) is set at a relatively large value. On the other hand, when the manipulation information Jm in the manual speed change mode indicates a sporty driving state, the filter constant KF2 is set at a relatively small value for increasing the sportiness degree.

Parenthetically, the outputs of the filter means 5 and 6 will be referred to as the speed-change pattern decision reference data (i.e., data to be referenced upon decision of the speed-change pattern).

The correcting means 7 performs predetermined correction processing on the output signals of the individual filter means 5 and 6 (speed-change pattern decision reference data undergone the filter processing) and then corrects the speed-change pattern for the automatic transmission 9 on the basis of the output data of the correction processing.

The continuous pattern switching means 8 generates the output signal Po for the pattern switching or changeover control in accordance with the corrected speed-change pattern.

Further, the correcting means 7 is so designed as to correct the speed-change pattern for the automatic transmission on the basis of the output signal of the filter means 5 when the motor vehicle is driven in the automatic speed change mode, while in the manual speed change mode, the correcting means 7 performs only the processing for updating the output signal of the filter means 6 without performing the correction of the speed-change pattern. Upon changeover of the manual speed change mode to the automatic speed change mode, the correcting means 7 corrects the speed-change pattern so that the output signal of the filter means 6 can be reflected in the correction of the speed-change pattern.

Furthermore, the correcting means 7 is so designed as to update the output signal of the filter means 6 for storing the updated data in the manual speed change mode. In other words, the output signal of the filter means 6 is not made use of in the manual speed change mode. However, the output signal of the filter means 6 is not reset but secured or saved in the manipulation information storage means 4 as the information which matches with the running state of the moter vehicle.

Next, referring to the flow chart of FIG. 2 together with FIG. 1, description will be made of the arithmetic operation or processing for acquiring the driving/operation information and the manipulation information in the manual speed change mode as executed by the speed-change pattern switching control system for the automatic transmission according to the instant embodiment of the invention.

Figure 2:
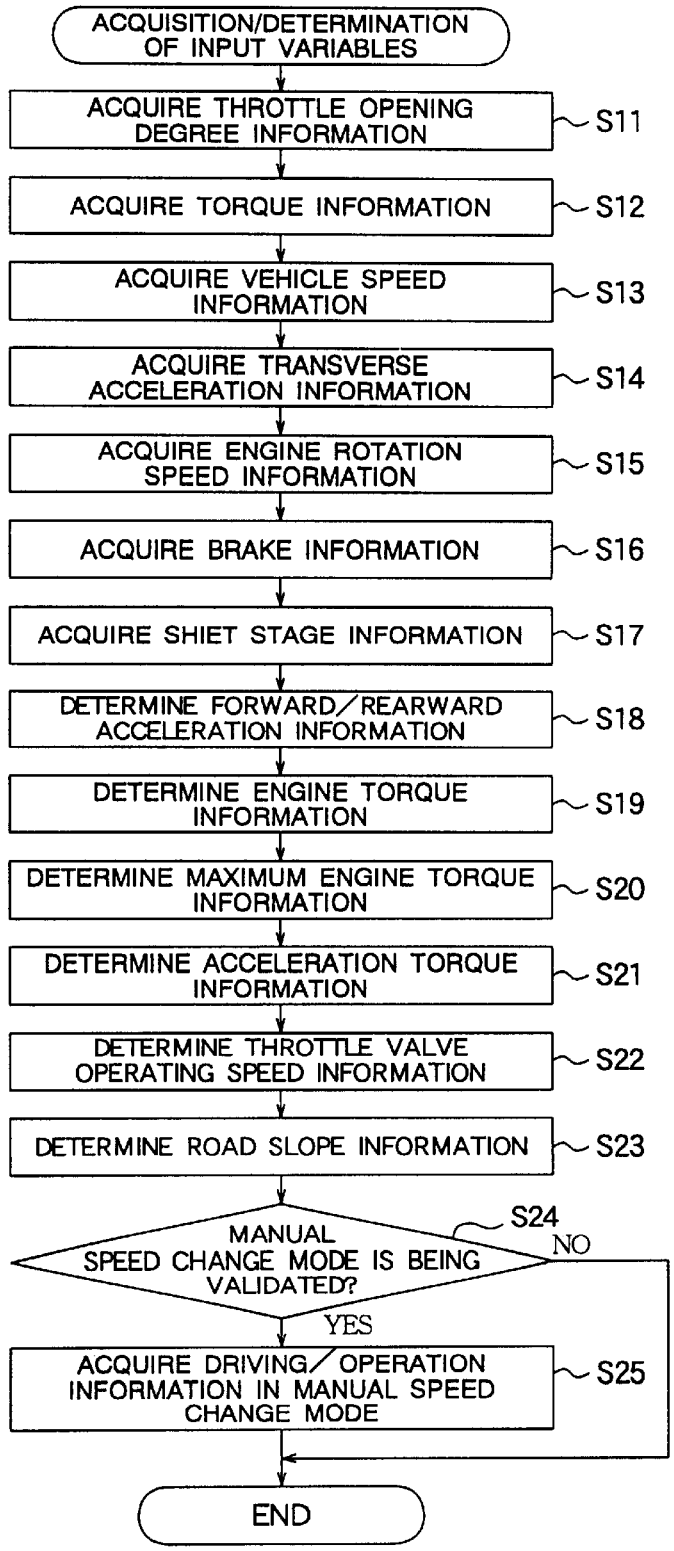
FIG. 2 is a flow chart for illustrating a processing for acquiring driving/operation information and arithmetic processing for determining various control data in the speed-change pattern switching control system for the automatic transmission according to an embodiment of the invention.

In the flow chart shown in FIG. 2, steps S24 and S25 are additional processing steps provided according to the teachings of the invention.

In the manual. speed change mode, the speed-change pattern switching based on the speed-change pattern decision reference data (see FIG. 3, step S36) is not carried out but the filter processing is executed by using the proper or appropriate filter constant corresponding to the running state.

At first, the ECU 10 fetches the throttle opening degree $\theta$ in a step S11, the various torque information in a step S12, the vehicle speed Vs in a step S13, the transverse or cross acceleration $\alpha s$ in a step S14, the engine rotation speed information in a step S15, brake information in a step S16 and the current shift stage (gear position) of the transmission Ps in a step S17.

Subsequently, the ECU 10 arithmetically determines the forward/rearward acceleration af in a step S18, the engine torque Te in a step S19, the maximum engine torque Tm in a step S20, the acceleration torque $T\alpha a$ in a step S21, a throttle valve operating speed in a step S22 and then road slope information in a step S23 on the basis of the various input information mentioned above.

In succession, in a step S24, the ECU 10 decides whether or not the manual speed change mode is being validated. When the decision step S24 results in affirmation "YES", the manipulation information Jm in the manual speed change mode is fetched in a step S25, whereupon the processing routine illustrated in FIG. 2 comes to an end.

On the other hand, when it is decided that the manual speed change mode is not being validated (i.e., when the decision step S24 results in "NO"), the processing routine illustrated in FIG. 2 is terminated without executing the processing step S25.

Next, referring to the flow chart of FIG. 3 together with FIG. 1, description will be made of a speed-change pattern switching decision processing in the speed-change pattern switching control system for the automatic transmission according to the instant embodiment of the invention.

Figure 3:
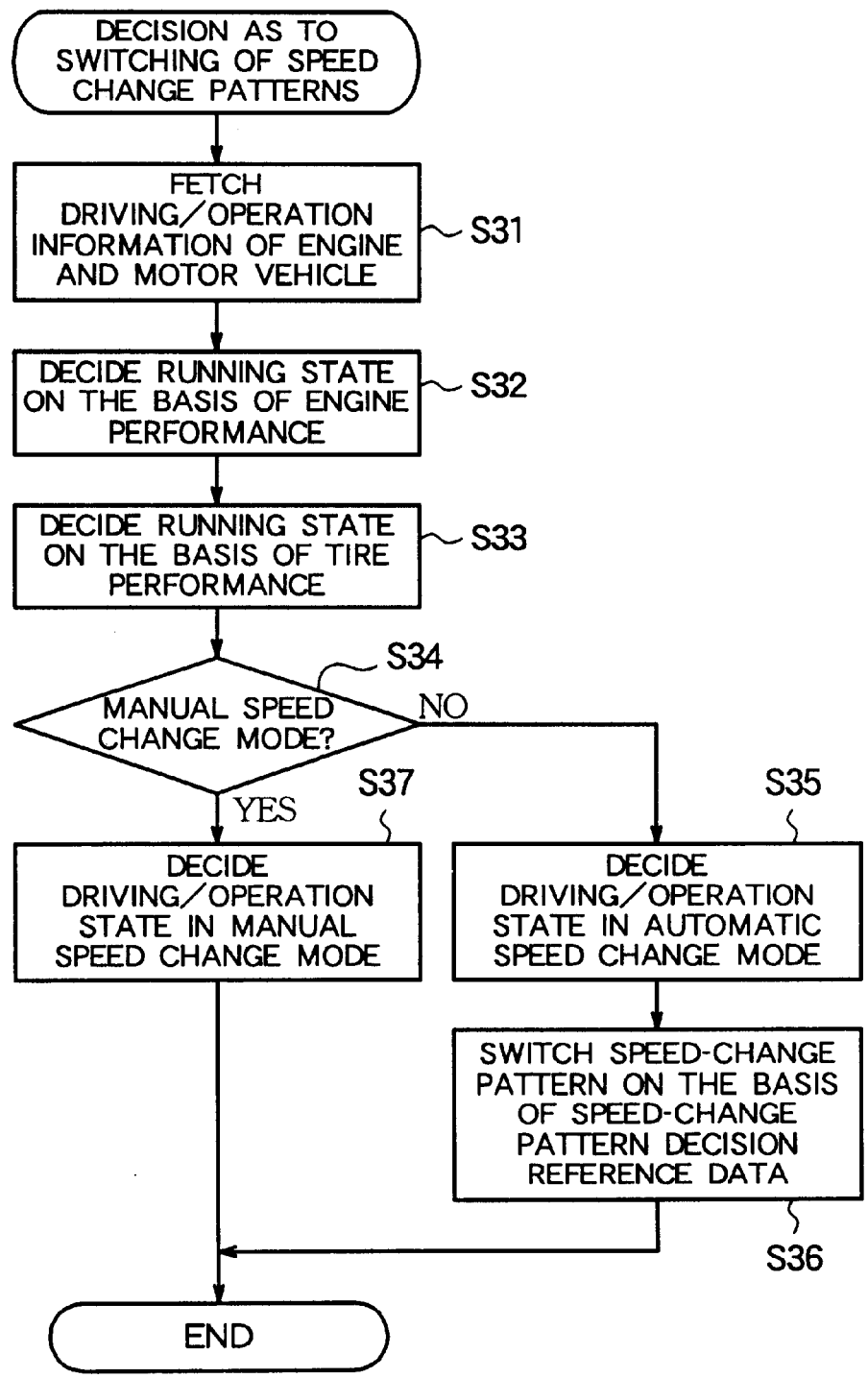
FIG. 3 is a flow chart for illustrating a speed-change pattern switching decision procedure executed by processor incorporated in the control system according to an embodiment of the invention.
Figure 5:
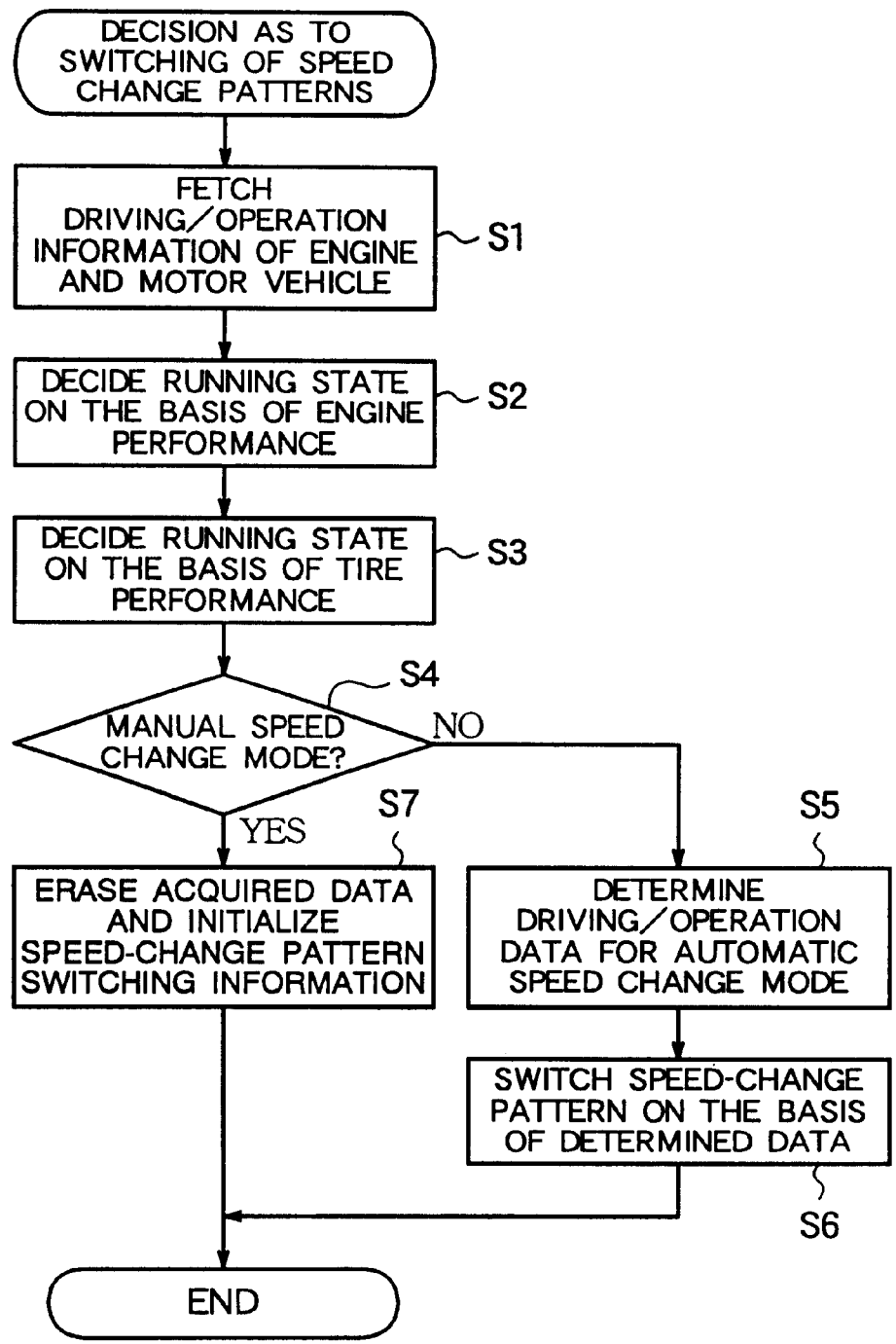
FIG. 5 is a flow chart for illustrating a speed-change pattern switching procedure executed by a conventional speed-change pattern switching control system for an automatic transmission of a motor vehicle.

Referring to FIG. 3, steps S31 to S36 correspond to the steps S1 to S6, respectively, described hereinbefore by reference to FIG. 5.

At first, the information obtained through the processing routine shown in FIG. 2 is inputted to the ECU 10 in a step S31, whereby the running state is decided on the basis of the engine performance in a step S32, which is then followed by the decision of the running state based on the tire performance information in a step S33.

In succession, the ECU 10 makes decision as to whether or not the current driving/operation information indicates that the manual speed change mode is being validated or effectuated (step S34). When it is decided that the automatic speed change mode is being validated (i.e., when decision step S34 results in "NO"), the decision for the automatic transmission operation is made in a step S35 in the same manner as described hereinbefore, to thereby select the speed-change pattern on the basis of the speed-change pattern decision reference data outputted from the filter means 5 (step S36).

On the other hand, when it is decided in the step S34 that the manual speed change mode is currently effectuated (i.e., when the step S34 results in "YES"), the driving/operation information in the manual speed change mode is determined, and the manipulation information Jm in the manual speed change mode is stored in the manipulation information storage means 4 dedicated for storage of the manipulation information in the manual speed change mode (step S37).

Next, description will be made of the filter constant KF1 of the filter means 5 used in the data processing in the automatic speed change mode in the step S35 in FIG. 3.

For convenience of description, the filter constants KF1 for various running states will be elucidated in order of priority by paying attention to the sportiness degree as one of the speed-change pattern decision reference data.

As the significance of the sportiness degree, the filter constants KF1 of the values mentioned below are set in correspondence to the running states of the motor vehicle, respectively.

(a) The filter constant KF1 for a fast speedup is set to a value of "0.0625 (=16/256). With the phrase "fast speedup", it is intended to indicate such a running state in which the motor vehicle is driven in a sporty fashion with the sportiness degree SPF of a small value and in which the sportiness degree is currently increasing immediately succeeding to the kick-down.

(b) The filter constant KF1 for a fast slowdown is set to a value of "0.3750 (=96/256). With the phrase "fast slowdown", it is contemplated to indicate such a running state in which the motor vehicle is being driven in a mild fashion with the sportiness degree decreasing.

(c) For a minimal-speed/speedup, the filter constant KF1 is set to a value of "0.0 (=0/256). With the phrase "minimal-speed/speedup", it is intended to indicate such a running state in which the speed of the motor vehicle is minimal and in which the sportiness degree is increasing.

(d) For a minimal-speed/slowdown, the filter constant KF1 is set to a value of "0.1250 (=32/256). With the phrase "minimal-speed/slowdown", it is contemplated to mean the running state in which the speed of the motor vehicle is minimal and in which the sportiness degree is decreasing.

(e) For a high-speed running of the motor vehicle, the filter constant KF1 is set to a value of "0.0039 (=1/256).

(f) For a standard running of the motor vehicle, the filter constant KF1 is set to a value of "0.0156 (=4/256). With the phrase "standard driving", it is contemplated to indicate the running state other than those (a) to (e) mentioned above.

The filter constant KF1 determined in correspondence to each of the running states of the motor vehicle is processed as the physical quantity data by the filter means 5, and the speed-change pattern decision reference data undergone the filter processing with the filter constant KF1 is made use of by the correcting means 7 for correcting the speed-change pattern in conformance with the running state. Incidentally, the physical quantity data are not restricted to the values mentioned above, which are mentioned only for the purpose of exemplification.

Next, description will be made of the filter constant KF2 of the filter means 6 used in the data processing in the manual speed change mode in the step S37 shown in FIG. 3.

The filter constants KF2 for various running state will be elucidated in order of priority by paying attention to the sportiness degree as one of the speed-change pattern decision reference data, as in the case of the filter constant KF1.

In accordance with the running states (1) to (6) mentioned below, the filter constant KF2 is set correspondingly. Although the values of the filter constant KF2 are not indicated in the concrete, it should be understood that the filter constant KF2 is generally set to a greater value than that of the filter constant KF1 so that high response and high sensitivity can be realized in the control.

(1) The filter constant KF2 for the fast speedup is validated in a running state in which the motor vehicle is driven in a sporty fashion with the sportiness degree SPF of a small value and in which the sportiness degree is increasing immediately succeeding to manual speed change by the driver in the manual speed change mode. This filter constant will be designated by KF(1).

(2) The filter constant KF2 for the fast slowdown is validated in a running state in which the motor vehicle is being driven in a mild fashion with the sportiness degree decreasing and without being accompanied with the manual speed change. This filter constant will be designated by KF(2).

(3) The filter constant KF2 for the minimal-speed/speedup is validated in a running state in which the speed of the motor vehicle is minimal and in which the sportiness degree is increasing. This filter constant will be designated by KF(3).

(4) The filter constant KF2 for the minimal-speed/slowdown is validated in a running state in which the speed of the motor vehicle is minimal and in which the sportiness degree is decreasing. This filter constant will be designated by KF(4).

(5) The filter constant KF2 for a high-speed running is validated when the motor vehicle is running at a high speed. This filter constant will be designated by KF(5).

(6) The filter constant KF2 for a standard-speed running is validated in the state other than those (1) to (5) mentioned above. This filter constant will be designated by KF(6).

Figure 4:
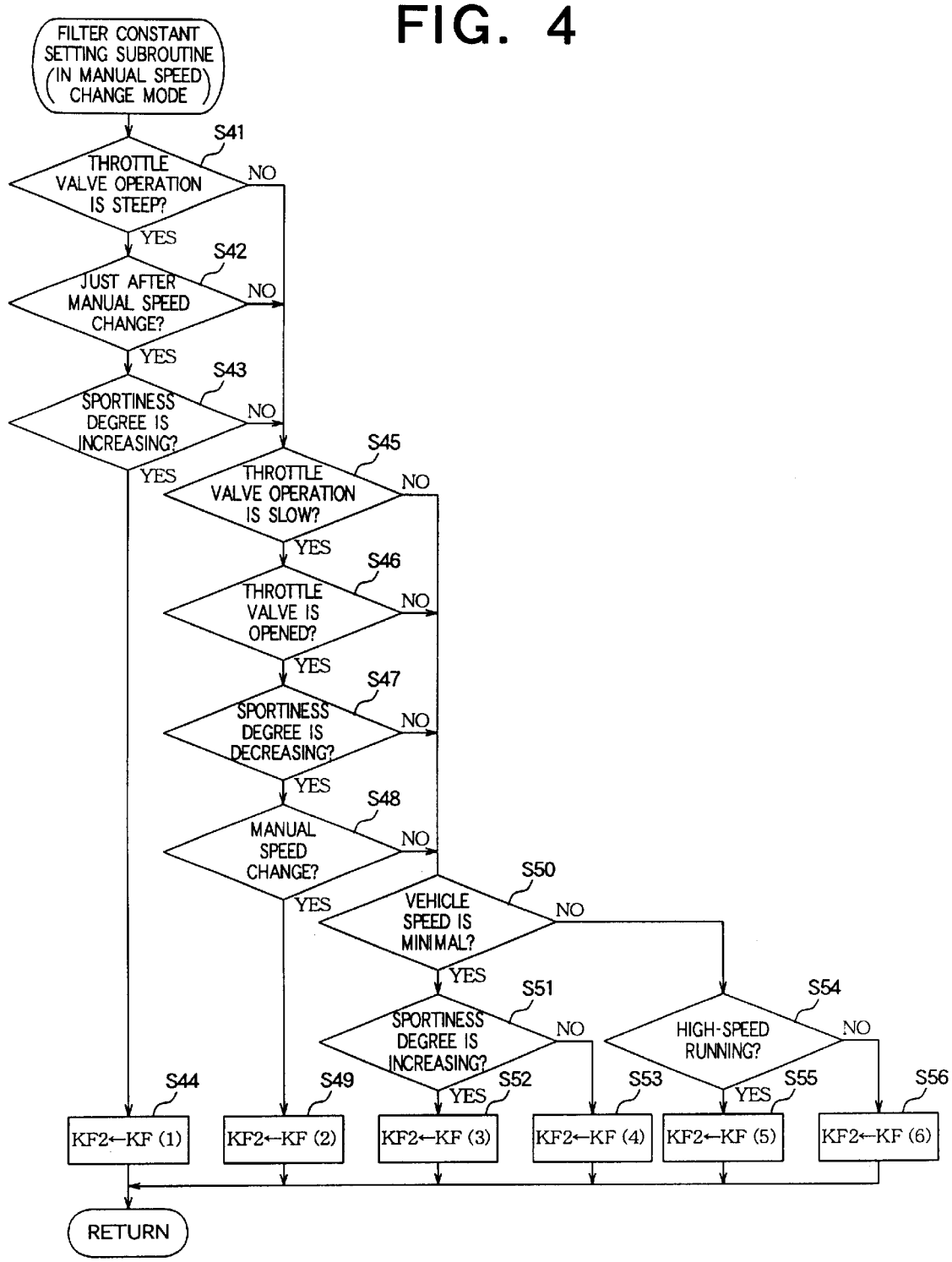
FIG. 4 is a flow chart for illustrating a filter constant setting procedure according to an embodiment of the invention.

Next, referring to a flow chart of FIG. 4, description will be made of a processing procedure for setting the filter constants KF2 corresponding to those KF(1) to KF(6) mentioned above.

At first, the processor of the ECU decides on the basis of the throttle valve operating speed information whether or not the throttle valve is actuated steeply (i.e., with high rate of speed change) (step S41).

When it is decided that the throttle valve is opened steeply (i.e., when the decision step S41 results in affirmation "YES"), decision is then made as to whether or not the manual speed change has been performed by the driver immediately before (step S42). When the decision step S42 results in "YES", it is then decided whether or not the sportiness degree is increasing in a step S43.

When the sportiness degree is increasing (i.e., when the decision step S43 results in "YES"), the filter constant KF(1) for the fast speedup defined previously is validated as the filter constant KF2 in a step S44.

On the other hand, when any one of the steps S41, S42 and S43 results in negation "NO", decision is then made on the basis of the throttle valve operating speed whether or not the throttle valve is opened slowly (step S45).

When the throttle operation is decided as being slow (i.e., when the decision step S45 results in "YES"), it is then decided succeedingly whether or not the throttle valve is in an opened state on the basis of the throttle opening degree θ(step S46).

When the throttle valve is in the opened state (i.e., when the decision step S46 results in affirmation "YES"), it is then decided succeedingly whether or not the sportiness degree is decreasing (step S47). When the sportiness degree is decreasing (i.e., when the decision step S47 results in "YES"), it is then checked whether or not the speed change has been brought about manually (step S48).

When it is decided that the manual speed change has not been carried out (i.e., when the decision step S48 results in "YES"), the filter constant KF(2) for the fast slowdown mentioned previously is validated as the filter constant KF2 (step S49).

On the other hand, when any one of the steps S45, S46, S47 and S48 results in negation "NO", decision is then made in a step S50 as to whether or not the vehicle speed Vs is minimal (extremely low). When the vehicle speed Vs is minimal (i.e., when the decision step S50 results in "YES"), it is then decided whether or not the sportiness degree is increasing (step S51).

When the sportiness degree is increasing (i.e., when the step S51 results in "YES"), the filter constant KF(3) for the minimal-speed/speedup defined hereinbefore is then validated as the filter constant KF2 (step S52).

On the other hand, when it is decided in the step S51 that the sportiness degree is not increasing (i.e., "NO" in the step S51), the filter constant KF(4) for the minimal-speed/slowdown defined hereinbefore is validated as the filter constant KF2 (step S53).

Furthermore, when the decision in the step S50 shows that the vehicle speed Vs is not minimal or extremely low (i.e., "NO" in the step S50), it is then decided on the basis of the vehicle speed Vs whether or not the motor vehicle is in a high-speed running state (step S54).

If it is decided in the step S54 that the motor vehicle is in the high-speed running state (i.e., "YES" in the decision step S54), the filter constant KF(5) for the high-speed running defined previously is validated as the filter constant KF2 (step S55). If otherwise, the filter constant KF(6) for the standard running defined previously is validated as the filter constant KF2 (step S56).

In this manner, during the period in which the manual speed change mode is selected by the driver, the ECU 10 performs the decision processings dedicated to the manual speed change mode and updates constantly the speed-change pattern decision reference data (the manipulation information Jm) for storage thereof, whereby the decision processing for switching the speed-change patterns in conformance with the driving/operation information can be executed continuously.

Furthermore, by updating and storing the output signal of the filter means 6 in the manual speed change mode, the speed-change pattern switching control can be carried out on the basis of the stored speed-change pattern decision reference data upon resetting of the manual speed change.

In other words, because the speed-change pattern decision reference data for the driving/operation information is held continuously even in the manual speed change mode, there can be assured smooth running of the motor vehicle while suppressing occurrence of unnecessary speed change after the manual speed change has been reset.

Besides, because the processing for determining the speed-change pattern decision reference data (manipulation information Jm) is performed by using the filter constant KF2 of relatively large values, the speed-change pattern switching decision processing can be executed rapidly in conformance with the driving/operation information even in the case where the manual speed change is reset after the selection thereof.

In this way, comfortableness of driving the motor vehicle can be ensured for the driver even after the selection of the manual speed change has been invalidated cleared by the driver. It should further be mentioned that the present invention can be implemented without need for change or modification of the mechanical components, circuitries, devices and other hardware in the existing control system for the motor vehicle. What is demanded is modification or alteration of the control procedure (software or program) executed internally of the ECU 10. Thus, the present invention can be realized very inexpensively, to another advantage.

Many modifications and variations of the present invention are possible in the light of the above techniques. It is therefore to be understood that within the scope of the appended claims, the invention may be practiced otherwise than as specifically described.

What is claimed is:

1. A control system for controlling switching of speed-change patterns for an automatic transmission of a motor vehicle, comprising:

various types of sensors for detecting driving states of the motor vehicle on which an automatic transmission is installed and operation states of said automatic transmission as driving/operation information;

running state decision means for deciding the running state of said motor vehicle on the basis of said driving/operation information;

first filter means for performing a filter processing on said running state information and said driving/operation information;

manipulation information storage means for storing manipulation information for said motor vehicle in a manual speed change mode;

second filter means for performing a filter processing on said manipulation information in said manual speed change mode, outputs of said running state decision means and said driving/operation information; and correcting means for correcting speed-change patterns for said automatic transmission on the basis of output signals of said first and second filter means, wherein said correcting means is so designed as to correct a speed-change pattern for said automatic transmission on the basis of the output signal of said first filter means in the automatic speed change mode of said motor vehicle, while updating the output signal of said second filter means in the manual speed change mode, and upon changeover from said manual speed change mode to said automatic speed change mode of said motor vehicle, said speed-change pattern is corrected such that the output signal of said second filter means can be reflected in said speed-change pattern.

2. A speed-change pattern switching control system for an automatic transmission according to claim 1, wherein a filter constant of said second filter means is set to a value differing from a filter constant of said first filter means.

3. A speed-change pattern switching control system for an automatic transmission according to claim 2, wherein the filter constant of said second filter means is set to a value greater than the filter constant of said first filter means.

4. A speed-change pattern switching control system for an automatic transmission according to claim 1, wherein said second filter means is so designed as to be capable of setting variably the filter constant on the basis of manipulation information acquired in said manual speed change mode.

5. A speed-change pattern switching control system for an automatic transmission according to claim 4, wherein said second filter means is so designed as to set the filter constant to a relatively large value for decreasing a degree of sportiness when the manipulation information in the manual speed change mode of said motor vehicle indicates a mild operation state, and wherein when the manipulation information in the manual speed change mode of said motor vehicle indicates a sporty operation state, the filter constant of said second filter means is set to a relatively small value for increasing the degree of sportiness.

6. A speed-change pattern switching control system for an automatic transmission according to claim 1, wherein said correcting means is so designed as to update the output signal of said second filter means for storage thereof when said motor vehicle is being driven in the manual speed change mode.

* * * * *